No. 636,571.  
Patented Nov. 7, 1899.
G. SIBLEY.
DENTAL DISK HOLDER.
(Application filed Apr. 27, 1899.)
(No Model.)
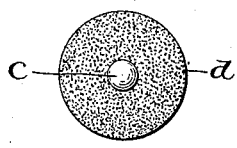
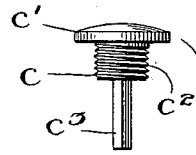
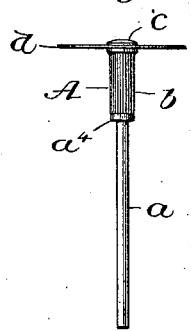
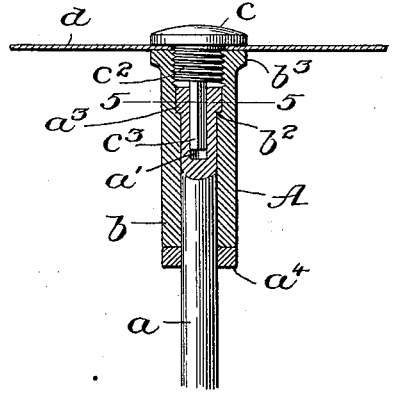
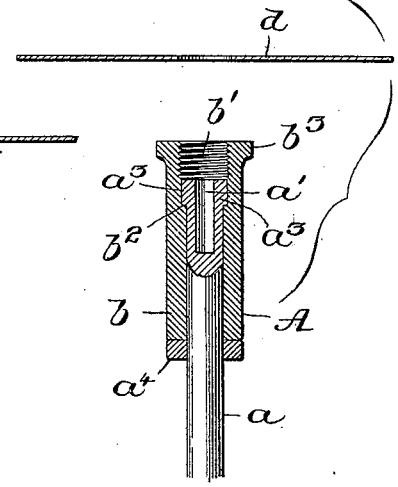
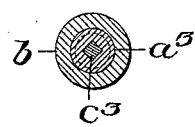
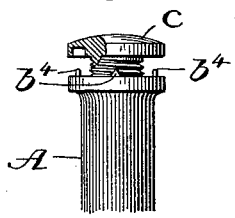
WITNESSES:
INVENTOR  
Gideon Sibley,  
BY John T. Nolan  
ATTORNEY

UNITED STATES PATENT OFFICE.

GIDEON SIBLEY, OF PHILADELPHIA, PENNSYLVANIA.

DENTAL DISK-HOLDER.

SPECIFICATION forming part of Letters Patent No. 636,571, dated November 7, 1899.

Application filed April 27, 1899. Serial No. 714,725. (No model.)

*To all whom it may concern:*

Be it known that I, GIDEON SIBLEY, a citizen of the United States, residing in the city and county of Philadelphia, in the State of Pennsylvania, have invented certain new and useful Improvements in Dental Disk-Holders, of which the following is a full, clear, and exact description, reference being had to the accompanying drawings, forming a part of this specification.

The object of this invention is to provide a simple and efficient construction of disk holder or mandrel for dental engines, and, as generally stated, it comprises an arbor, a threaded sleeve thereon, and a clamping-head fitted to said sleeve and having a sliding connection with the arbor, whereby a grinding or polishing disk may be securely yet detachably clamped between said head and sleeve, as will be hereinafter fully described and claimed.

In the annexed drawings, Figure 1 is a side elevation of the invention, showing a disk clamped thereby. Fig. 2 is a plan of the same. Fig. 3 is a longitudinal vertical section thereof, enlarged. Fig. 4 is a similar view of the several parts as detached. Fig. 5 is a transverse section on the line 5 5 of Fig. 3. Fig. 6 is a view of a slight modification below described.

A represents the mandrel, which is adapted to be connected with and driven by the rotatable spindle in the usual handpiece of a dental engine. This mandrel embodies in its construction an arbor $a$, a sleeve $b$, and a clamping-head $c$. The arbor is provided in its outer end with an axial recess or socket $a'$, which is preferably, though not essentially, square in cross-section. The sleeve $b$ is rotatably fitted upon this end of the arbor and is provided with an internally-screw-threaded portion $b'$, which projects beyond the latter. In the present instance the sleeve is provided with an internal shoulder $b^2$, upon which bears a flange $a^3$ on the upper end of the arbor, and in conjunction with a collar $a^4$, fast on the arbor, serves to maintain the sleeve in place. The outer extremity of the sleeve is preferably flanged or expanded, as at $b^3$, to afford ample bearing-surface for the disk. The clamping-head $c$ comprises a cap $c'$, provided with a threaded portion $c^2$, which is adapted to be screwed into the threaded portion of the sleeve, and provided also with a centrally-depending stem $c^3$, adapted to register with the recess or socket in the arbor. The cross-section of the stem corresponds with that of the recess or socket, so as to prevent rotation of the clamping-head independently of the arbor, yet permit free longitudinal movement of said head. Hence by properly turning the sleeve in respect to the arbor the head may be vertically adjusted, so as to screw the cap down upon or retract it from the opposing end of the sleeve. Thus it will be seen that an ordinary perforated grinding or polishing disk, as $d$, may be applied to the under side of the head and the latter then be screwed hard upon the sleeve in a manner to clamp the disk securely in place; also, that by simply reversing the operation the clamping-head and disk may be detached from the sleeve of the mandrel.

In Fig. 6 I have shown a slight modification wherein the flanged end of the sleeve is provided with small spurs $b^4$, which are adapted to penetrate the disk, the cap of the clamping-head being cup-shaped or socketed to receive the spurs.

I claim as my invention—

1. A dental disk-holder, comprising an arbor, a rotatable sleeve thereon provided with a projecting threaded portion, means to prevent longitudinal movement of said sleeve, and a clamping-head provided with a threaded portion adapted to the threaded portion of the sleeve, the said threaded portion of the head and the opposing extremity of the arbor being provided one with a socket and the other with a stem which is fitted to said socket, the said socket and stem being of such cross-sectional form as to afford a sliding connection between said head and arbor yet prevent independent rotation thereof in respect to each other.

2. A dental disk-holder, comprising an arbor flanged at one end thereof and provided with a longitudinal recess or socket and with a flange, and an internally-shouldered sleeve on said arbor coacting with said flange provided with a projecting internally-threaded portion, in combination with a clamping-head provided with a threaded portion adapted to the threaded portion of the sleeve, and with a stem adapted to the recessed or socketed portion of the arbor, the said socket and stem being of such cross-sectional form as to afford a sliding connection between said head and arbor yet prevent independent rotation thereof in respect to each other.

In testimony whereof I have hereunto affixed my signature in the presence of two subscribing witnesses.

GIDEON SIBLEY.

Witnesses:
JOHN R. NOLAN,
HARRY C. DINMORE.